United States Patent [19]
Poulsen

[11] 3,786,781
[45] Jan. 22, 1974

[54] TURTLE TRAY AND HOOD (A NATURAL HABITAT)

[76] Inventor: Gene M. Poulsen, 5455 Sheffield Ct. Apt. 52, Alexandria, Va. 22311

[22] Filed: July 24, 1972

[21] Appl. No.: 274,397

[52] U.S. Cl. ................................................ 119/5
[51] Int. Cl. ............................................ A01k 64/00
[58] Field of Search ..................... 119/5, 3, 17, 19

[56] References Cited
UNITED STATES PATENTS

| 3,141,442 | 7/1964 | Harris | 119/5 |
| 3,091,220 | 5/1963 | Willinger et al. | 119/5 |
| 3,622,777 | 11/1971 | Borio | 119/5 X |
| 3,699,921 | 10/1972 | Janicek | 119/5 |

Primary Examiner—Hugh R. Chamblee

[57] ABSTRACT

An enclosure for placement upon a conventional aquarium tank such as is used in a home for tropical and other fish, the enclosure comprising a tray upon which turtles may climb from the aquarium water, and a hood that is placeable over the tray so to present the turtles to escape, the hood accordingly including sliding access doors on a front side for servicing the tray area, the front and sides of the hood having viewing windows, and a top of the hood having lamps directing light rays downwardly on the tray and aquarium tank.

1 Claim, 10 Drawing Figures

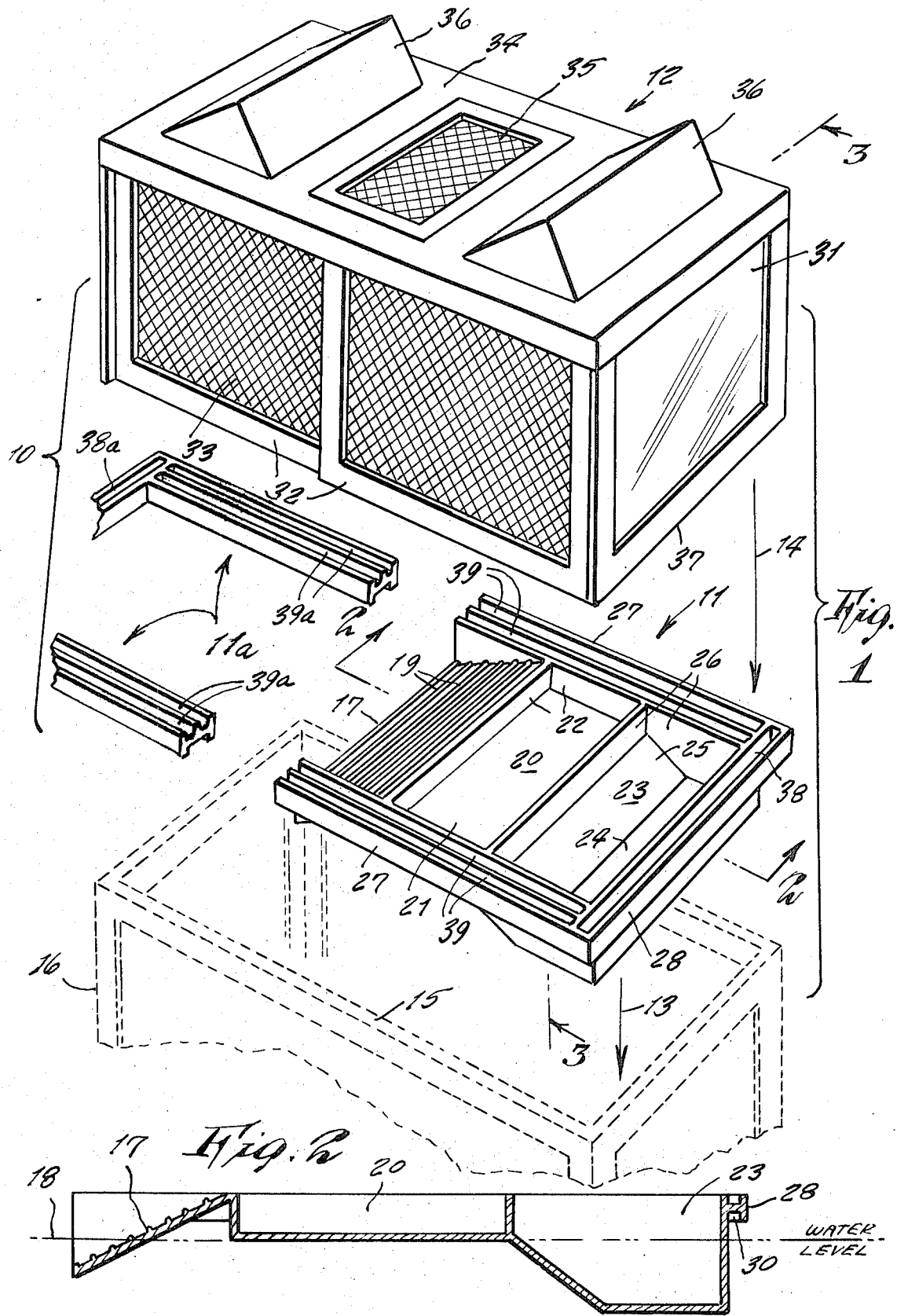

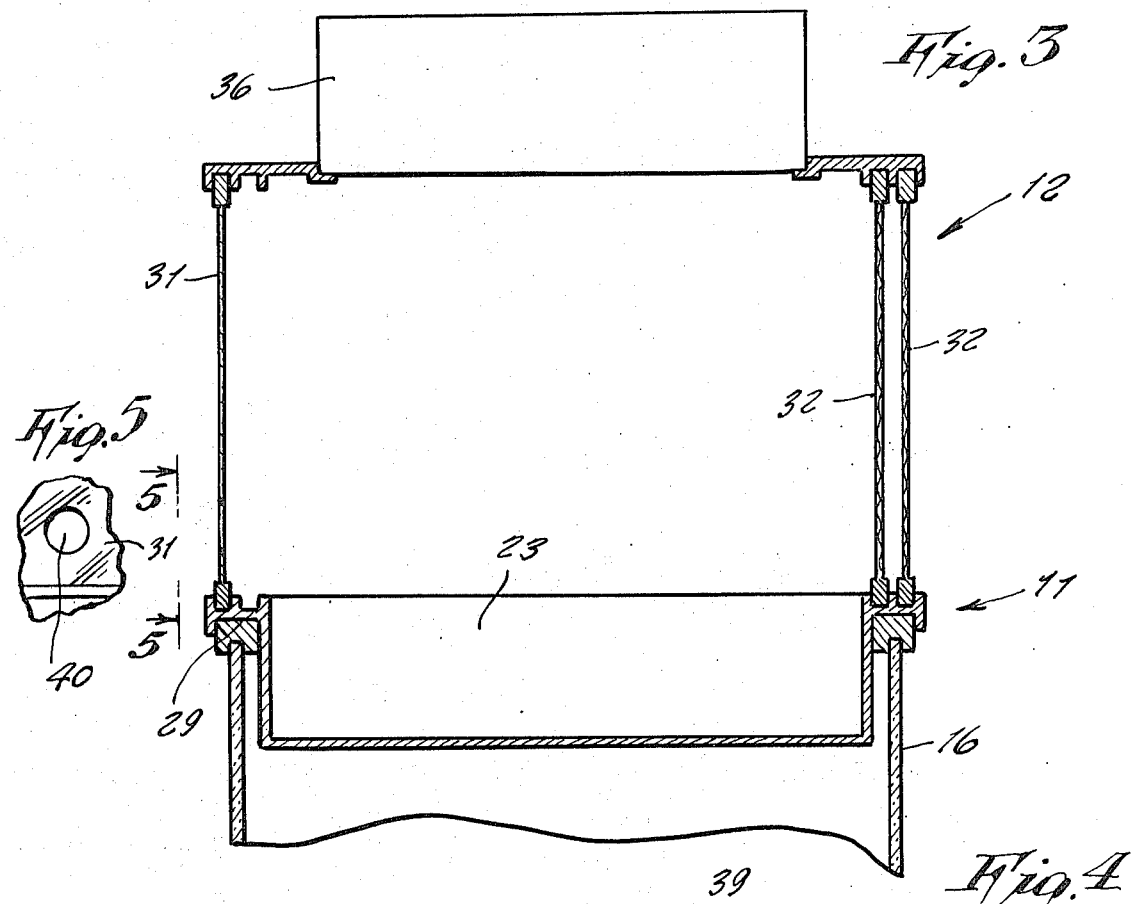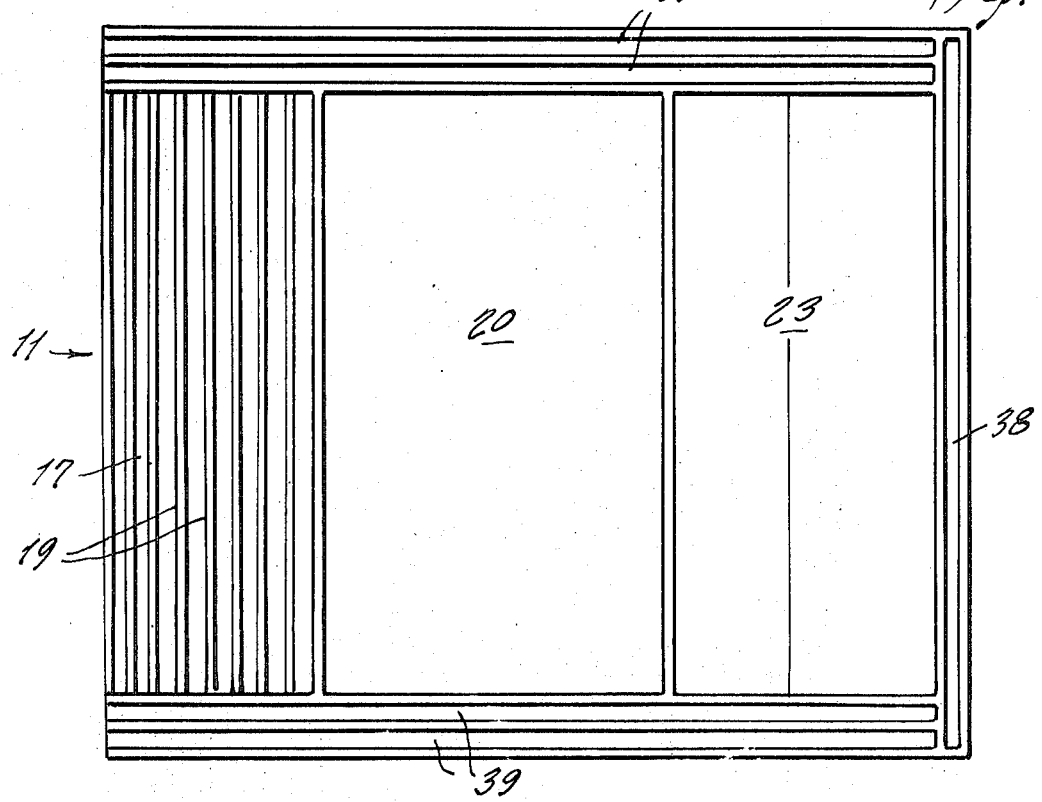

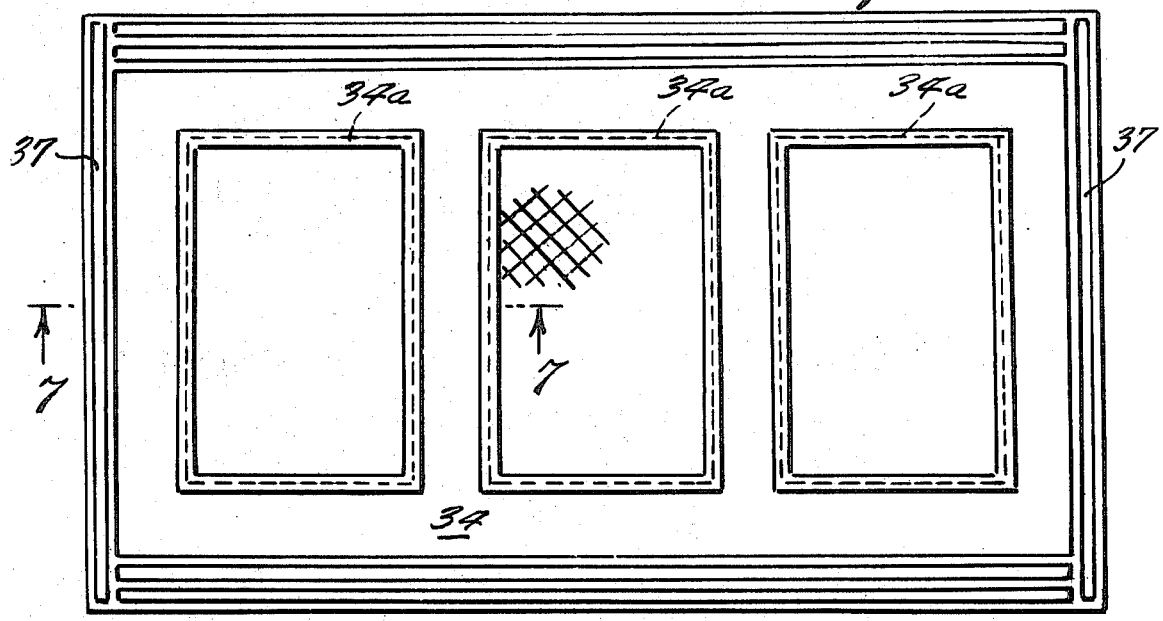
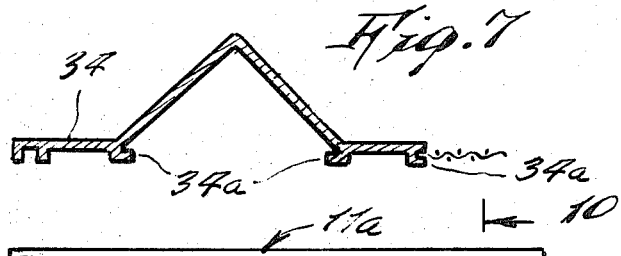
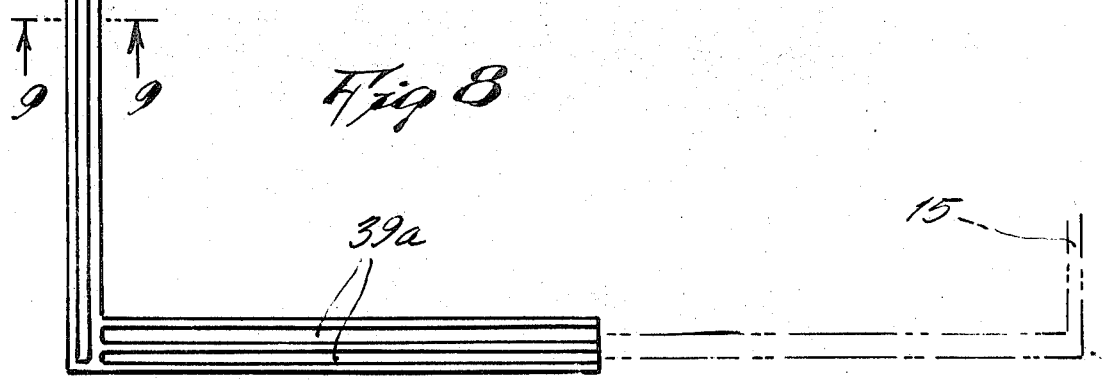

TURTLE TRAY AND HOOD (A NATURAL HABITAT)

This invention relates generally to home aquarium accessories.

A principal object of the present invention is to provide equipment for placement upon a conventional home fish aquarium so that the aquarium is suitable for containing turtles as well as fish.

Another object of the present invention is to provide equipment placable upon a conventional home fish tank and which forms a natural habitat for turtles.

Yet another object of the present invention is to provide equipment which consists of a tray and hood that are placable upon the aquarium for association therewith and which can be quickly and easily removed therefrom whenever so desired or to service the fish tank.

Other objects of the present invention are to provide a turtle tray and hood which is simple in design, inexpensive to manufacture, rugged in construction, easy to use and efficient in operation.

These and other objects will be readily evident upon a study of the following specification and the accompanying drawing wherein:

FIG. 1 is a perspective exploded view of the componene of the present invention shown in relative position for placement upon a fish aquarium.

FIG. 2 is a cross sectional view of the tray taken on line 2—2 of FIG. 1.

FIG. 3 is a cross sectional view taken on line 3—3 of FIG. 1 and showing the tray and hood mounted on the fish aquarium.

FIG. 4 is a top plan view of the turtle tray.

FIG. 5 is a detail view taken on line 5—5 of FIG. 3 and illustrating access opening means for a filter, heater or the like.

FIG. 6 is a bottom view of the hood.

FIG. 7 is a cross sectional view on line 7—7 of FIG. 6.

FIG. 8 is a top view of the hood adapter.

FIG. 9 is a cross sectional view on line 9—9 of FIG. 8.

FIG. 10 is a cross sectional view on line 10—10 of FIG. 8.

Referring now to the drawings in detail, the reference numeral 10 represents an assembly of equipment for producing a natural habitat for turtles, the equipment consisting of a tray 11, an adapter 11a and a hood 12. As is indicated by arrows 13 and 14, in FIG. 1, the tray and hood are placable upon an upper edge 15 of a conventional aquarium 16 such as is used in a home for keeping tropical and other fish.

The turtle tray 11 comprises a singular unit that accordingly for pratical purposes is perferably made from molded rigid plastic material and which at one end thereof has an inclined approach ramp 17 up which turtles may climb out of the water in the aquarium 16. Therefore as shown in FIG. 2, the lower end of the ramp 17 extends below a water level 18 of the fish aquarium so that the turtles can swim upon the lower end of the ramp. A series of horizontal extending cleets or ribs 19 across the upper surface of the ramp provide traction means for the turtles to climb up the ramp. Adjacent the ramp 17 there is a central area on the tray which consists of a depression 20 within which a few rocks and a mixture of sand and gravel can be placed so that turtles may climb thereupon. The depression 20 accordingly includes a flat bottom wall 21 and upstanding side and end walls 22. At the opposite end of the tray 11 there is a depression 23 in which a mixture of moist sand and mud may be placed for use of the turtle. The depression 23 includes horizontal bottom wall 24 adjacent an inclined bottom wall 25, and vertically upstanding side and end walls 26.

A sideward extending flange 27 is provided on opposite side edges and a sidewardly extending flange 28 on one of the end edges thereof, the flanges providing a means for resting the tray upon edge 15 of the aquarium 16 and also for supporting there upon the hood 12. The underside of the flanges 27 accordingly include a lower groove 29 into which the upper edge of the aquarium fits. Likewise the flange 28 on its underside has an upper groove 30 for the same purpose.

The hood 12 comprises a box like enclosure member which upon its front and rear sides is fitted with viewing windows 31 for observation of the turtles when upon the tray. A rear side of the hood is provided with sliding doors 32 which are each fitted with screens 33. The top wall 34 of the hood has a central frame screen 35 for allowing circulation of air through the device. Additionally a pair of lamp units 36 are fitted there upon for directing light rays downwardly toward the tray and aquarium. Lipped edges 34a around openings in the top wall 34 serve to secure the screen and lamps so that they do not easily fall out. The bottom of the hood accordingly is left open, and the end edges 37 of the hood fits in a groove 38 and 38a formed on the ends of the tray and the adapter. The lower edges of the sliding doors 32 each fit within one of the grooves or channels 39 and 39a on one side of the tray and adapter whereas the lower opposite side edge of the hood front wall is received in the outer grooves 39 and 39a of the tray and adapter, as is shown in FIG. 3. It is to be noted that the hood is of size so as to completely cover the top of the aquarium whereas the turtle tray is of shorter length than the aquarium so that the turtles have access to the approach ramp. Thus the tray is positioned toward one end of the aquarium while the adapter is at the other end or more openings 40 maybe provided through the sides of the hood, as shown in FIG. 5 so to provide access for filter, heater or other equipment in use with the tank.

The tray and hood maybe manufactured in various different sizes so that the same can be utilized with different sizes of fish aquariums.

Thus the present invention provides a natural habitat for turtles that can use the water of a fish aquarium. Thus the turtle has access to clean filtered water which is enough for proper swimming exercise. Live natural food can be introduced to the tank such as bait minnows so to permit use of preditory instincts and dietary need to be satisfied. The lamps provide light rays for drying out the shells of the turtles, and thus prevent the ailment of soft shell. Thus the turtles can grow healthy and live longer.

What I now claim is:

1. In an assembly for placement upon a conventional fish aquarium, the combination of a means whereby turtles are provided with a natural habitat and which can utilize the water of said fish tank for swimming, said natural habitat including an area where they can dry out and receive sufficient heat from lamps so to prevent getting a soft shell, said assembly being comprised of a tray and adapter which are placeable upon an upper edge of said fish aquarium, and a hood placeable upon said tray and adapter, said tray comprising a unitary member made preferably of molded rigid plastic and including a ramp at one end, a central depression for containing rocks and a mixture of sand and gravel, and another depression for containing moist sand and mud, said depression for sand and mud being spaced away from said ramp by means of said central depression being therebetween, said hood including vertical, screened sliding side doors, vertical observation side glass windows, and lamps for directing light rays downwardly, said doors being slidably retained between grooves on an upper side of said tray and adapter, and grooves on an underside of said hood, and at least one said lamp being directly over said tray where said turtles dry out.

* * * * *